Figure 1:
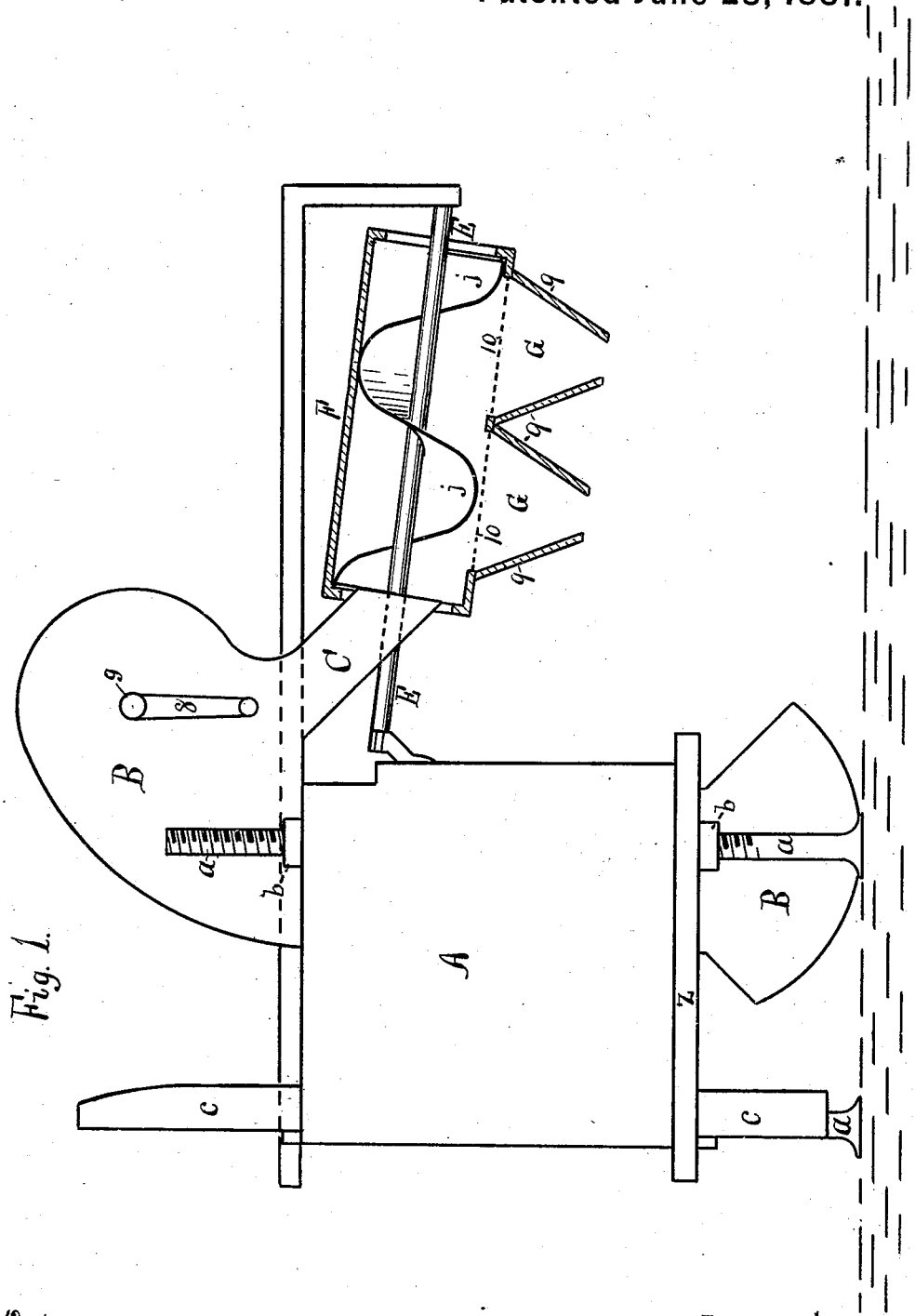

(No Model.) 6 Sheets—Sheet 1.

J. R. MOFFITT.
Coffer Dam.

No. 243,457. Patented June 28, 1881.

Witnesses.
W. J. Dudley
Kasimir Vogel

Inventor.
John R. Moffitt
By Porter & Hutchinson
Attys.

(No Model.) 6 Sheets—Sheet 4.

J. R. MOFFITT.
Coffer Dam.

No. 243,457. Patented June 28, 1881.

Witnesses
W. C. Dudley.
Kasimir Vogele

Inventor:
John R. Moffitt
By Porter & Hutchinson, Attys.

(No Model.)  6 Sheets—Sheet 5.
J. R. MOFFITT.
Coffer Dam.
No. 243,457.  Patented June 28, 1881.
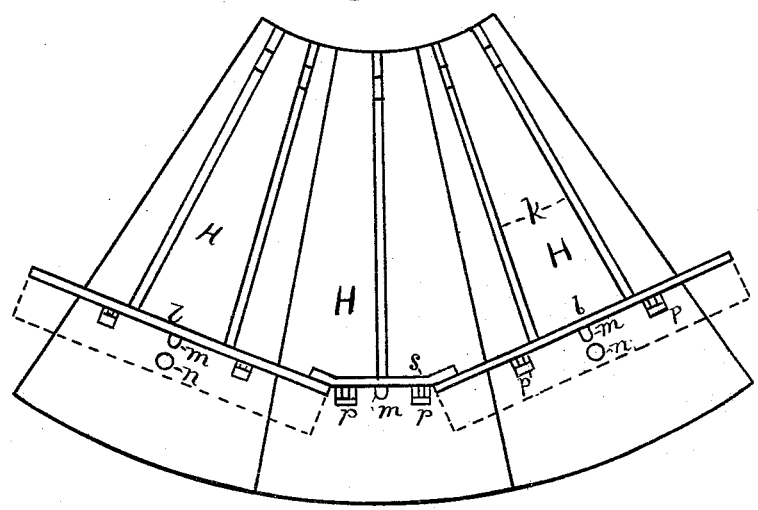
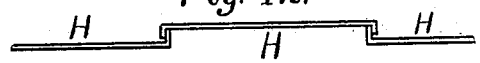
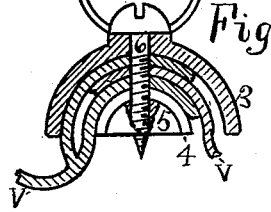
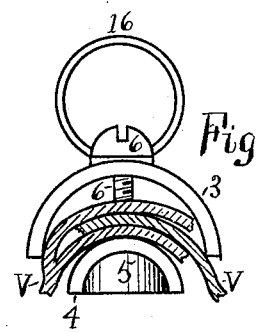
Witnesses.  Inventor.
W. J. Dudley  John R. Moffitt
Kasimir Vogel  By Porter & Hutchinson
  Attys.
N. PETERS, Photo-Lithographer, Washington, D. C.

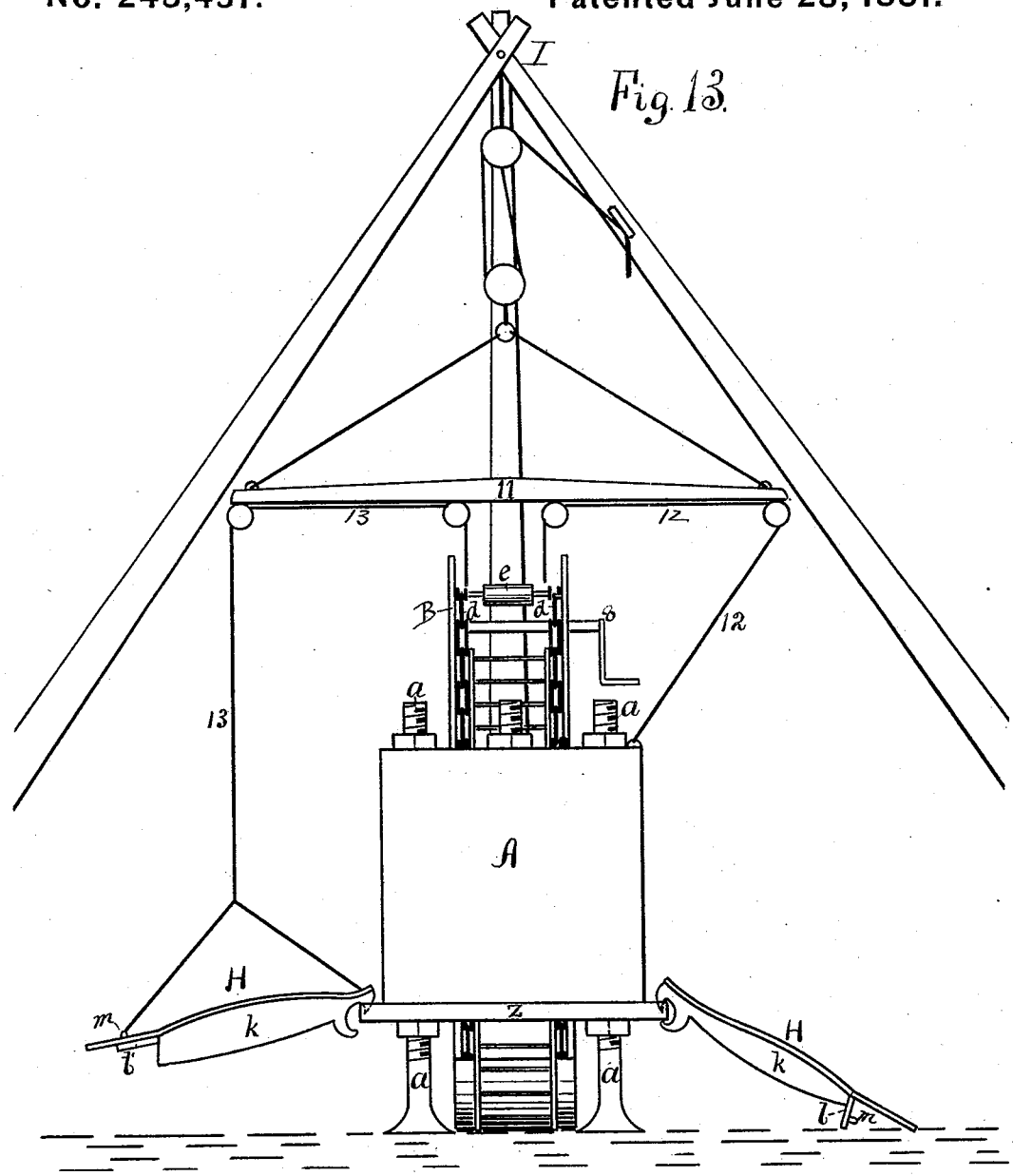

UNITED STATES PATENT OFFICE.

JOHN R. MOFFITT, OF BOSTON, MASSACHUSETTS.

COFFER-DAM.

SPECIFICATION forming part of Letters Patent No. 243,457, dated June 28, 1881.

Application filed March 12, 1881. (No model.)

*To all whom it may concern:*

Be it known that I, JOHN R. MOFFITT, of the city of Boston, State of Massachusetts, have invented an Improved Portable Coffer-Dam for Mining Purposes, of which the following is a specification.

The object of my invention is to enable miners to excavate and examine the beds of rivers in search of the gold there deposited without turning the current of such rivers, or otherwise disturbing or displacing it, except to pump out the interior of the dam within which the excavation and search are to be made. This result I accomplish by means of a suitable curb or cylinder, formed preferably of boiler-iron, which cylinder is adjustably supported upon three or more standards, so as to be raised or lowered thereon at will, or that the standards may be raised or lowered. Within said curb is arranged means for ascent and descent of the workmen, as also a bucketed endless chain or other suitable means of raising and discharging the earth as it is excavated, such hoisting apparatus being arranged to be raised or lowered or extended downward as the excavation progresses; and in connection with such discharger, a revolving or other suitable washer is arranged to receive the earth from the elevator and separate the finer from the coarser part, the former being gathered by suitable hoppers, and the latter delivered overboard. Around said curb are arranged a series of divergent metallic sections, formed preferably of boiler-iron and suitably ribbed or corrugated, and interlocked not only with a flange on said curb, but also with each other at their meeting radial lines, the outer ends of said sections resting on the river-bed around such curb. At the intersecting angle of said curb and sections I arrange a ring of sheet metal having a curved cross-section, and around said curb and extending outward beyond said sections is arranged a gum-elastic apron or shield, formed in sections and fitted to be at its upper edge secured water-tight to said curb, while the outer portions of its skirt are coated upon the under side with an adhesive coating which will not harden under water, but will adhere closely to the surface of the river bed or bottom, thereby serving to form a water-tight contact or union between such apron and earthy bed. I also employ a chain or other yielding weight upon the outer portions of said skirt, to insure the desired contact between the same and the river-bottom.

Figure 2:
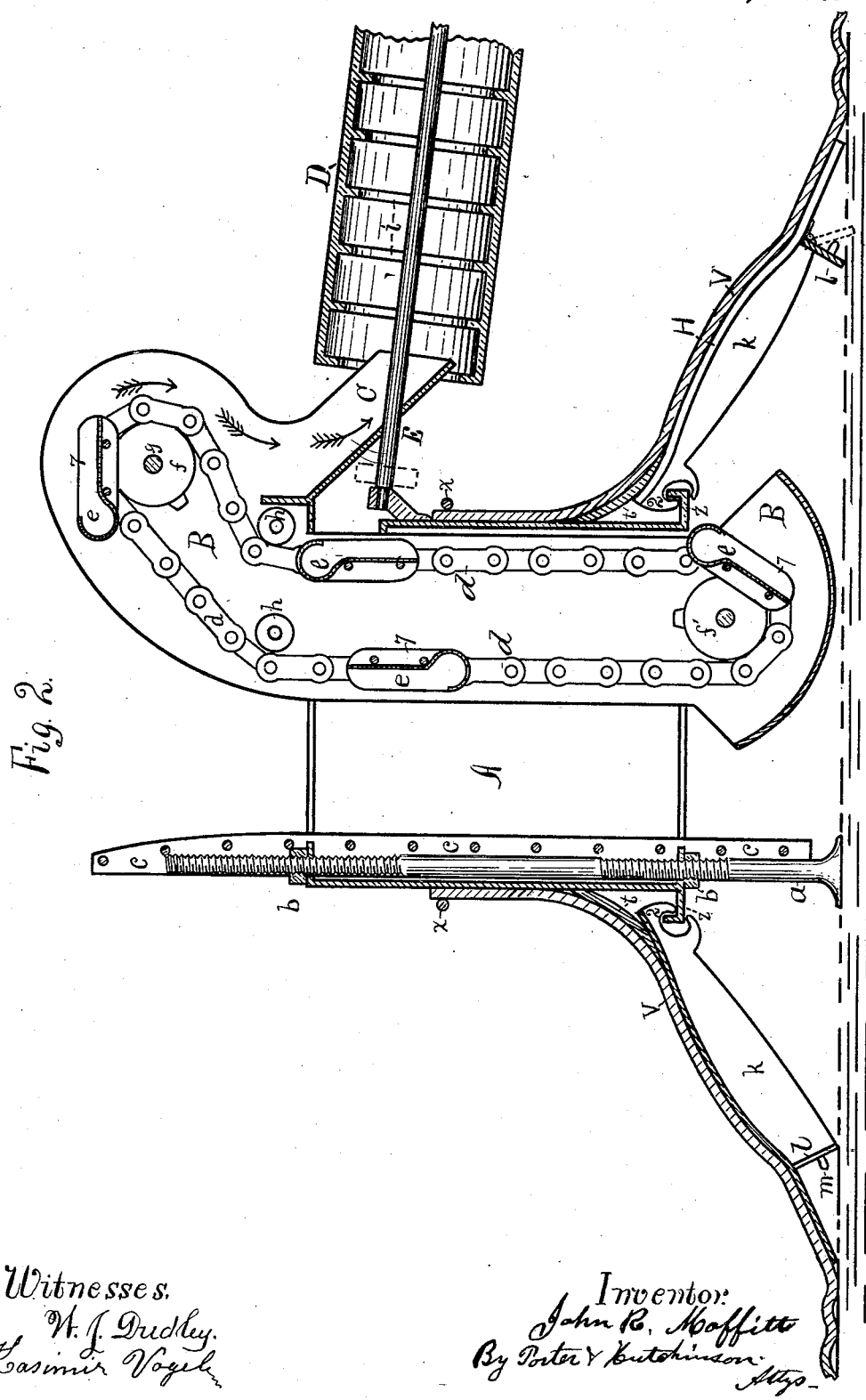
Figure 3:
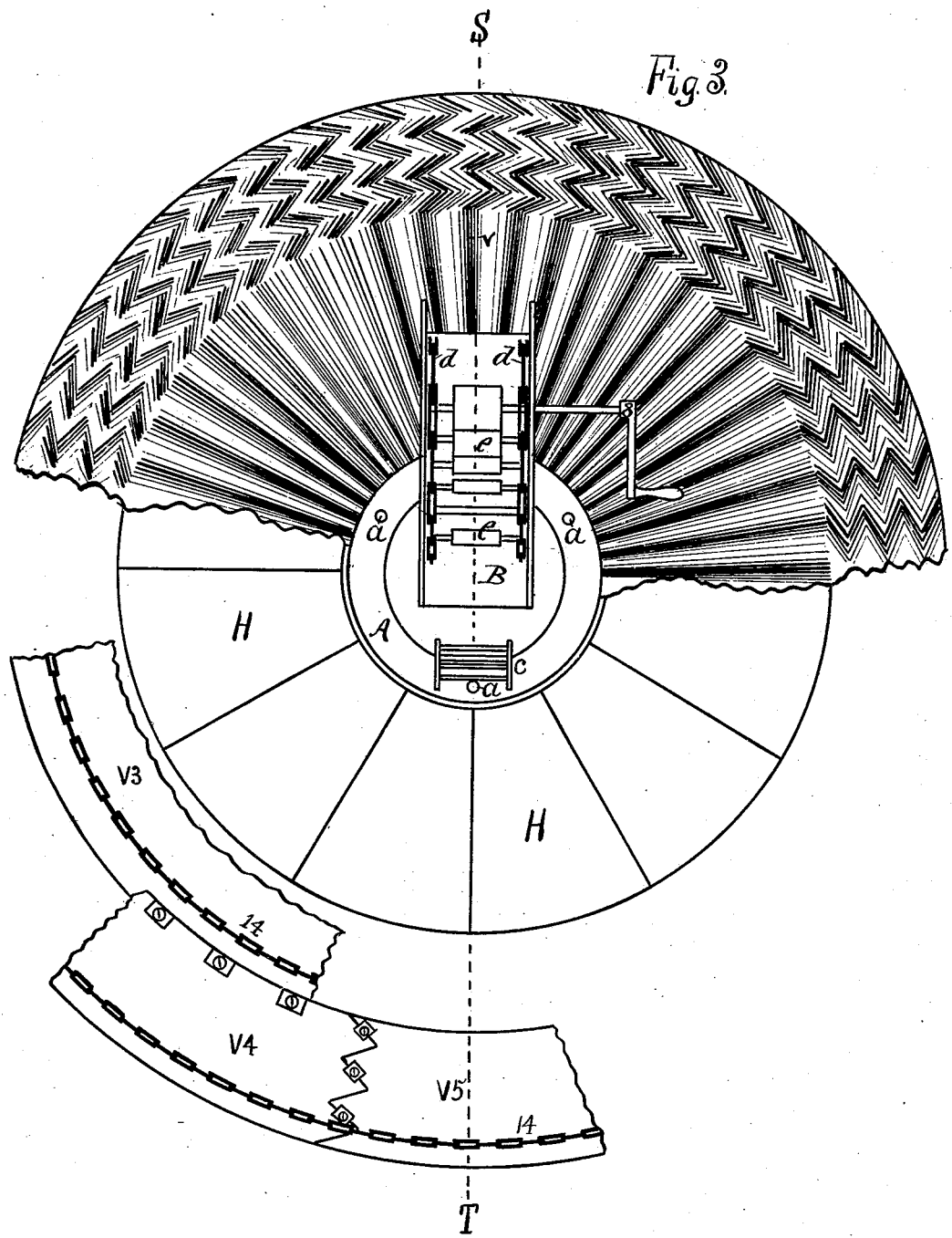
Figure 4:
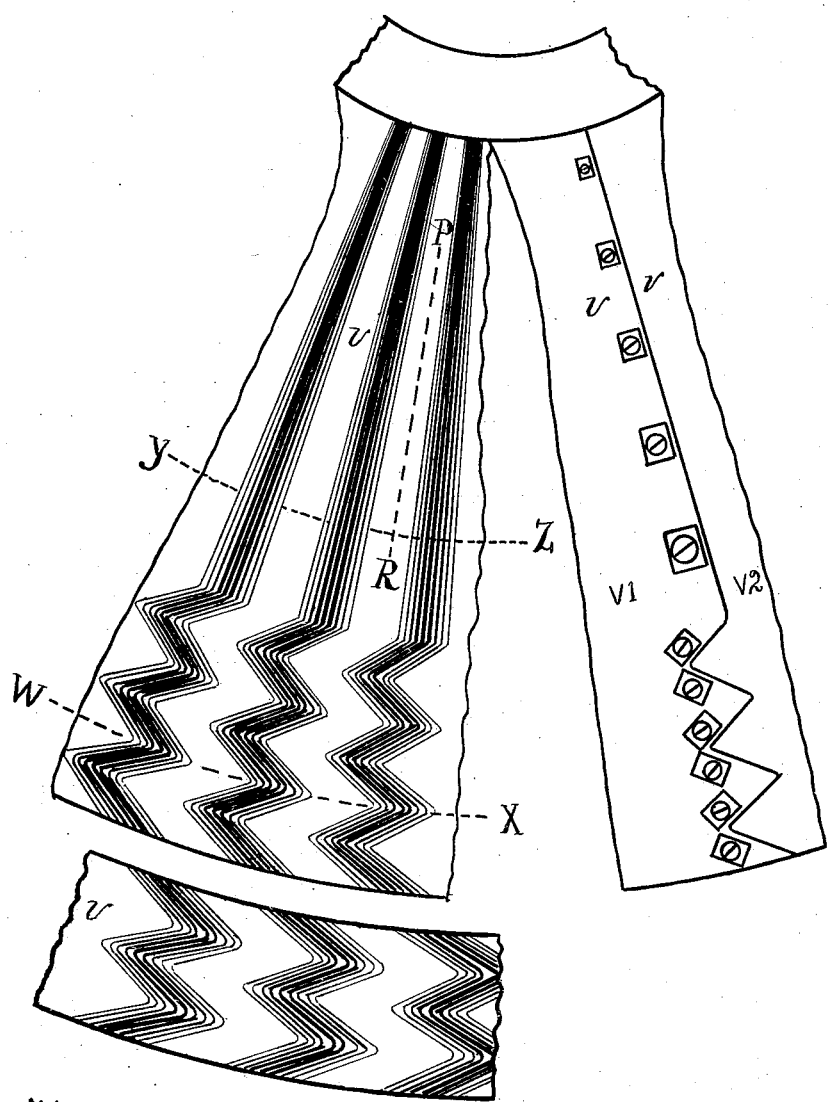

In the annexed drawings, Figure 1 is a side elevation of the curb and its supports, the ladder, hoister, and delivery-chute, the rotary washer and gathering-hoppers being shown in vertical section. Fig. 2 is a vertical longitudinal section taken as on line S T, Fig. 3, and showing, in addition to the several parts shown in Fig. 1, the elastic apron, also in vertical section, and the radial section-plates in edge elevation, and the concentrically-ribbed rotary washer. Fig. 3 is a top or plan view, showing the several parts, as in Figs. 1 and 2, except the rotary washer, and a portion of the skirt is broken away to show the radial plates, while the method of uniting the sections of such skirt is also shown, and a portion of the ballasting-chain is also shown. Fig. 4 is a detached plan view of portions of the skirt, showing the inner vertical collar thereof, the form of the flutings or convolutions of the slanting portion, and the method of securing the radial joints of the connecting-sections. Fig. 5 is an inverted or under-side view of three of the radial base sections, showing both their strengthening-ribs and swinging curb sections. Fig. 6 is a detached vertical section, taken as on line R P, Fig. 4, and showing a portion of the fluted skirt. Fig. 7 is also a detached vertical section taken on line Y Z, Fig. 4, and showing the convolutions or fluting of the skirt. Fig. 8 is a section similar to Fig. 7, but taken on line W X, Fig. 4, and showing the fluting of the skirt at that point. Fig. 9 is a side elevation of one of the binding-clamps with which I unite the meeting-borders of the skirt-sections. Fig. 10 is a transverse section taken through the lineal center of Fig. 9, and also showing therein the interlocked skirt-edges. Fig. 11 is an end elevation of said binding-clamp, and also showing the skirt-edges in section and in the clamp, as in Fig. 10. Fig. 12 is an outer end elevation of the radial metallic plates, and showing the method of interlocking the same. Fig. 13 is a side elevation, showing the curb in position upon its adjustable supports, and with one radial base-plate in position, and another as being lowered into position by means of shears and other devices, all or part of which are also employed in lowering the curb and other parts into place.

In the said views, A represents the metallic curb, which may be of such diameter, height, and strength as may be requisite for the depth of water and other conditions of its use. Said curb rests upon supports $a$, (preferably three,) and is adjustable relatively to said supports by means of screw-nuts $b$ threaded on said standards, or by equivalent means, whereby said curb may be arranged perfectly level, though said supports rest upon foundations of varying heights. A ladder, $c$, is arranged at one side of the curb to afford the requisite facilities for descent into or ascent out of the curb. At the side of the curb opposite the ladder an elevator, B, is arranged for raising the material that is excavated within the dam, and it may be arranged and adjusted to its work in any of the well-known methods applicable to such a device. Within said elevator is arranged the endless chain $d$, which passes at the top over sprockets $f$, and at the bottom over sprockets $f'$, while the pulleys $h$, on which the chain rests, serve to guide it past the curve in the elevator-tube. Upon chain $d$ are secured the lifting-buckets $e$, so attached to the chain by the side checks, 7, that the buckets are inverted as they pass over pulley $f$, and so discharge their load into chute C at every circuit of their path. The elevating-chain may be actuated by the crank on sprocket-shaft 8, Figs. 1, 2, 3.

In Figs. 1 and 2 is shown a shaft, E, journaled in bearings secured to and supported by curb A. On said shaft is shown, in Fig. 1, a spiral or screw conveyer, which revolves coincidently with said shaft, and within the cylindrical case F, which at its bottom is secured to the walls 9 of hopper G, into which the lesser particles will fall through the apertures 10 in the lower wall of the cylinder, as the screw-conveyer carries forward the earthy matter, which is delivered by buckets $e$ on chain $d$ into chute C, and which thence falls into cylinder F.

In Fig. 2 a cylinder, D, is shown, mounted fixedly on and to revolve with shaft E, the concentric interior ribs in said cylinder serving to retain the finer and heavier particles, while the flow of water through the cylinder would carry off the lighter and sedimentary part of the matter discharged therein from chute C.

Around the base of curb A is joined or rigidly secured an angular flange, $z$, upon which are interlocked and supported the converging ends of the radial base-sections H, by means of hooks 2 of said sections. Upon said sections are formed or secured the longitudinal strengthening-ribs $k$, and the curb-sections $l$ and $s$ are alternately hinged or secured to sections H by hinges P, as shown in Fig. 5. Upon sections $l$ and $s$ is secured an eye, $m$, which, when said sections are folded upon sections H, passes through hole $n$ in H, and serves as a means of attachment for the hoisting and lowering apparatus, to be hereinafter described. When curb A and sections H are in position, the metallic collar $t$ is arranged to cover the space between said curb and sections, after which the convoluted circular elastic skirt $v$ is placed over the base-sections H, and, extending up the sides of the curb above the water-line, is thereto secured by a cord, hoop, or gasket, as shown at $x$, Fig. 2. Said skirt is formed of rubber and canvas, and the proper compounds, so as to be strong, elastic, yielding, and durable, and it may be formed of such number of pieces or sections as may be requisite in view of economy and durability, or as the size of the apparatus may render expedient; and the flutings in that portion of the skirt which rests upon sections H, I form radial, as shown in Figs. 3 and 4, while that portion of said skirt which extends beyond the base-sections H is formed with its flutings either zigzag or undulating, and so as to cross and recross a radial path.

Fig. 6 shows a section taken on line P R, Fig. 4, which is that portion of the skirt formed with direct radial lines, while Fig. 7 shows a section taken on line Y Z, Fig. 4, and transverse to said direct radial lines; and Fig. 8 is a section taken on line W X, Fig. 4, where said flutings are undulated relatively to a radial path. By thus forming said skirt with the fluting radial where it rests upon the base-plates H it will, when subjected to the water-pressure, conform and fit closely to said plates, and the undulated flutings are for the purpose of allowing that portion of the skirt which extends beyond plates H to expand or yield in both a radial and circumferential direction, in order that such projecting portion of the skirt may, without injury or undue strain, conform to the inequalities of the surface upon which it may rest.

For the purpose of firmly uniting the sections of skirt V, I have devised a clamp formed with a curved outer plate or shell, 3, an inner plate or shell, 4, and a nut, 5, formed as a part of and in the lineal center of shell 4, a screw, 6, being threaded in nut 5 and passing through outer shell, 3, on which the screw-head is seated. A ring, 16, is secured in said screw-head for use in raising and lowering the skirt and for securing the anchoring-chain. In Figs. 10 and 11 the method of uniting the meeting edges of the skirt and of securing the same by the screw-clamps is clearly shown, one of such edges being shown as in two folds or thicknesses and the other edge being inserted between the folds of the opposite edge, while the clamping-screw passes through all three of such thicknesses, and, by the aid of plates 3 and 4, binds the folds of the skirt closely together.

In Fig. 4, the two sections $v'$ and $v^2$ of the skirt are shown as united by said clamps both upon the straight and undulated portion of a radial line. In Fig. 3 $v^3$ represents a detached section of skirt $v$, to which a section, $v^4$, is united by said clamps on a circumferential line, while another section, $v^5$, is united to section $v^4$ on a radial or diametric line, said several examples of uniting the sections of skirt $v$ being introduced to show the manner in which said skirt, when formed in sections divided on radial or circumferential lines, or both, may be readily united so as to be impervious to water; and said curb A may be formed either in rings or sections, so as to readily be transported to places which could not be reached if such curb were formed as an entirety.

In setting up my coffer-dam a set of shears, as shown at I, Fig. 13, or a derrick located upon the shore or afloat, as most convenient, may be employed, the curb A being first placed in position and adjusted upon its supports $a$, when the base-sections are successively lowered into position and interlocked, both with each other, as shown in Fig. 12, and with base-flange $z$ of curb A, as shown in Figs. 2 and 13. For such work a guy-bar, 11, suspended from the shears, may be advantageously employed, one of its ends being anchored by guy 12, while rope 13 is employed for suspending and lowering said sections into place, one lead of said rope 13 being attached to the inner end of said sections, while the other is secured by a hook to eye $m$ of the curb-sections $l\ s$, which, when said curb-sections are folded down, extend up through hole $n$ in sections H. When the sections are all in place, then the skirt $v$ is lowered into place and the meeting-edges duly united. As sections H are placed in position, the hinged curbs $l$ and $s$ are opened out against ribs $k$ and serve to prevent the pressure of the water from forcing the surface-earth toward the central excavation. After the skirt $v$ is in position a weighting-chain, 14, Fig. 3, is placed in a circumferential line upon said skirt, outside of base H, and so as to firmly press said skirt upon the river-bed. Said chain may be arranged upon radial arms extending across the top of curb A, and then lowered at once into position, or it may be "paid out" from above and placed in position by a diver in submarine armor, such an assistant being requisite in setting up my dam in deep water. Said chain is secured in position by attaching it to the rings 16 of the clamp-screws 6. When the entire apparatus or dam is thus in position the inclosed water is discharged, either by the use of the before-described elevator or by a hand or steam pump, after which the earth is excavated from within and below the curb, and is raised and discharged by the elevator, and as such excavation is carried downward the curb is at times supported upon temporary props while standards $a$ are being readjusted. Such excavation may extend beyond the boundary of the curb a distance proportioned to the depth of the excavation and the nature of the material in which it is made.

Upon the under side of that portion of the skirt which extends beyond base H, I apply, before it is submerged, a thick and highly adhesive coating of cement, which remains plastic and adhesive for years and which will not harden either under water or when exposed to the air. This cement adheres to the river-bottom, and prevents the percolation of water between the skirt and earth-surface and into the excavation, said cement being also introduced into the joints where the edges of the skirt are united, that the joints may be waterproof.

In Figs. 7 and 8 said cement is shown at 15 as applied to the under side of the skirt.

This apparatus being constructed in sections, as described, it can be carried into places only accessible to men and pack-mules, and it can be quickly set up in streams without resorting to the laborious, expensive, and hazardous experiment of damming and turning the same, and at any time except when such streams are swollen by heavy rains, and the excavation can be not only carried directly down to the bed-rock, but all the seams, crevices, and pockets therein, where heavy metals like gold always settle, can be carefully searched, cleansed, and examined in the search for precious metals. If the point examined is rich in deposit, the reward is ample; and if the spot is barren of rich metal, then the loss is but slight, involving only the time spent in the effort, as the apparatus can be at once removed to another point.

In narrow streams the shears or derrick for handling the apparatus can be located upon the shore, and all the operations be from thence directed; but in wider bodies of water a scow, or raft, or other float for operating the derrick and facilitating the operations might be necessary.

This apparatus is not only of great utility for mining purposes, but is equally useful for purposes of excavating and laying the foundations of piers or other structures, or for laying bare and examining portions of the beds of rivers or other bodies of water.

I claim as my invention—

1. The combination of curb A, having suitable vertical supports, and provided with the supporting-flange $z$, and the base-sections H, formed to be interlocked with the curb by means of its said flange, substantially as specified.

2. In combination with curb A and base-sections H, the supports $a$, vertically adjustable relatively to the curb, substantially as specified.

3. The combination of curb A, base-plates H, and an elastic and impervious skirt, $v$, constructed and arranged to be secured to said curb and to extend beyond said base to be anchored to the ground, substantially as specified.

4. In combination with base-plates H, the curb-flanges $l\ s$, hinged to plates H and arranged to fold down thereon, with stops $k$, to resist inward pressure upon the curb-sections, substantially as specified.

5. The vertical ribs $k$, formed upon base-plates H, to strengthen the same and serve as the stop for the curb-sections $l$ $s$ when subjected to pressure from without, substantially as specified.

6. The base-sections H, formed with the vertical interlocking ribs for securing in place and strengthening the same, substantially as specified.

7. A skirt or covering, $v$, fluted to conform to irregular surfaces, and provided with an adhesive coating for producing a water-tight contact, substantially as specified.

8. The skirt or covering $v$, formed in sections, with an edge formed double or in two folds to receive the opposite and connecting single edge, substantially as specified.

9. The method of forming a water-tight removable joint between the sections of the skirt by forming one edge thereof double and the other single, with an adhesive cement thereto applied, and compressing the same by metallic clamps when interlocked, substantially as specified.

10. In combination with the yielding or elastic skirt $v$, a weighting-body consisting of a series of parts or members united together by joints or flexible connections, whereby each part or member may conform to the surface of the ground beneath it, and so that such body can be delivered upon or removed from said skirt by means of such jointed connection of its parts, substantially as specified.

11. The metallic coupling-clamp formed with the outer shell rib, 3, the inner shell, 4, with its nut 5, and the compressing-screw 6, with ring 16, substantially as specified.

12. In combination with curb A, base-sections H, and skirt $v$, the transversely-curved collar $t$, substantially as specified.

JOHN R. MOFFITT.

Witnesses:
T. W. PORTER,
EBEN HUTCHINSON.